United States Patent
Xin

(10) Patent No.: US 8,983,553 B2
(45) Date of Patent: Mar. 17, 2015

(54) IN COMING CALL WARNING DEVICE AND METHOD USING SAME

(71) Applicant: Yang Xin, Shenzhen (CN)

(72) Inventor: Yang Xin, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 195 days.

(21) Appl. No.: 13/664,432

(22) Filed: Oct. 31, 2012

(65) Prior Publication Data

US 2013/0273894 A1    Oct. 17, 2013

(30) Foreign Application Priority Data

Apr. 16, 2012    (CN) .......................... 2012 1 0110508

(51) Int. Cl.
| | | |
|---|---|---|
| H04M 1/00 | (2006.01) | |
| H05K 11/02 | (2006.01) | |
| H04M 1/725 | (2006.01) | |
| H04M 19/04 | (2006.01) | |

(52) U.S. Cl.
CPC .......... *H04M 1/72577* (2013.01); *H04M 19/04* (2013.01)
USPC ...................................... 455/569.2; 455/345

(58) Field of Classification Search
CPC .................................................... H04W 4/04
USPC ............ 455/556.1, 26.1, 557, 345, 569.2, 57, 455/456.1, 456.4, 41.2
See application file for complete search history.

(56) References Cited

U.S. PATENT DOCUMENTS

| | | | |
|---|---|---|---|
| 6,408,177 B1 * | 6/2002 | Parikh et al. ................ | 455/414.4 |
| 6,718,187 B1 * | 4/2004 | Takagi et al. ............... | 455/569.2 |
| 7,049,941 B2 * | 5/2006 | Rivera-Cintron et al. . | 340/425.5 |
| 8,212,661 B2 * | 7/2012 | Shuster ......................... | 340/438 |
| 8,275,348 B2 * | 9/2012 | Yen et al. ..................... | 455/404.1 |
| 2004/0198306 A1 * | 10/2004 | Singh et al. .................... | 455/345 |
| 2005/0181838 A1 * | 8/2005 | Matsuda et al. .............. | 455/567 |
| 2006/0105817 A1 * | 5/2006 | Naick et al. ................... | 455/567 |
| 2006/0199575 A1 * | 9/2006 | Moore et al. .................. | 455/418 |
| 2006/0217161 A1 * | 9/2006 | Nath et al. ................. | 455/569.2 |
| 2010/0197284 A1 * | 8/2010 | Small et al. ................ | 455/414.1 |
| 2010/0234047 A1 * | 9/2010 | Lipovski ..................... | 455/456.4 |
| 2011/0021213 A1 * | 1/2011 | Carr ............................ | 455/456.4 |
| 2011/0039581 A1 * | 2/2011 | Cai et al. ..................... | 455/456.4 |
| 2011/0105082 A1 * | 5/2011 | Haley .............................. | 455/411 |
| 2011/0105097 A1 * | 5/2011 | Tadayon et al. ............... | 455/418 |
| 2011/0304465 A1 * | 12/2011 | Boult et al. ..................... | 340/576 |
| 2011/0307188 A1 * | 12/2011 | Peng et al. ........................ | 702/33 |
| 2012/0071151 A1 * | 3/2012 | Abramson et al. ............ | 455/418 |
| 2012/0151055 A1 * | 6/2012 | Kansal et al. ................. | 709/225 |
| 2013/0049987 A1 * | 2/2013 | Velusamy ..................... | 340/905 |

(Continued)

*Primary Examiner* — Christopher M Brandt
(74) *Attorney, Agent, or Firm* — Novak Druce Connolly Bove + Quigg LLP

(57) ABSTRACT

An incoming call warning device includes a storage unit, a communication unit, a detector, and an incoming call warning module. The storage unit stores a plurality of reference parameters. The communication unit determines whether a call is made to the incoming call warning device. The detector detects a plurality of detected parameters when a call is made to the incoming call warning device. The incoming call warning module receives and compares the reference parameters and the detected parameters, determines whether a user of the incoming call warning device is driving according to a comparison result, and warns the user not to answer an incoming call while driving.

20 Claims, 2 Drawing Sheets

(56) References Cited

U.S. PATENT DOCUMENTS

| | | | |
|---|---|---|---|
| 2013/0090103 A1* | 4/2013 | Kim et al. | 455/418 |
| 2013/0102298 A1* | 4/2013 | Goodman et al. | 455/417 |
| 2013/0271605 A1* | 10/2013 | Winner, Jr. | 348/148 |
| 2014/0051405 A1* | 2/2014 | Chhaunker et al. | 455/414.1 |

* cited by examiner

IN COMING CALL WARNING DEVICE AND METHOD USING SAME

TECHNICAL FIELD

Embodiments of the present disclosure relate to an incoming call warning device and a method using the incoming call warning device.

DESCRIPTION OF RELATED ART

Mobile phones are widely used in everyday lives. However, it is not safe for a user to use the mobile phone in some special such as while driving, because answering an incoming call will draw his or her attention away from driving.

Thus, an incoming call warning device and method is desired to overcome the above-described shortcomings.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include compact discs (CDs), digital video discs (DVDs), BLU-RAY disks, Flash memory, and hard disk drives.

Figure 1:
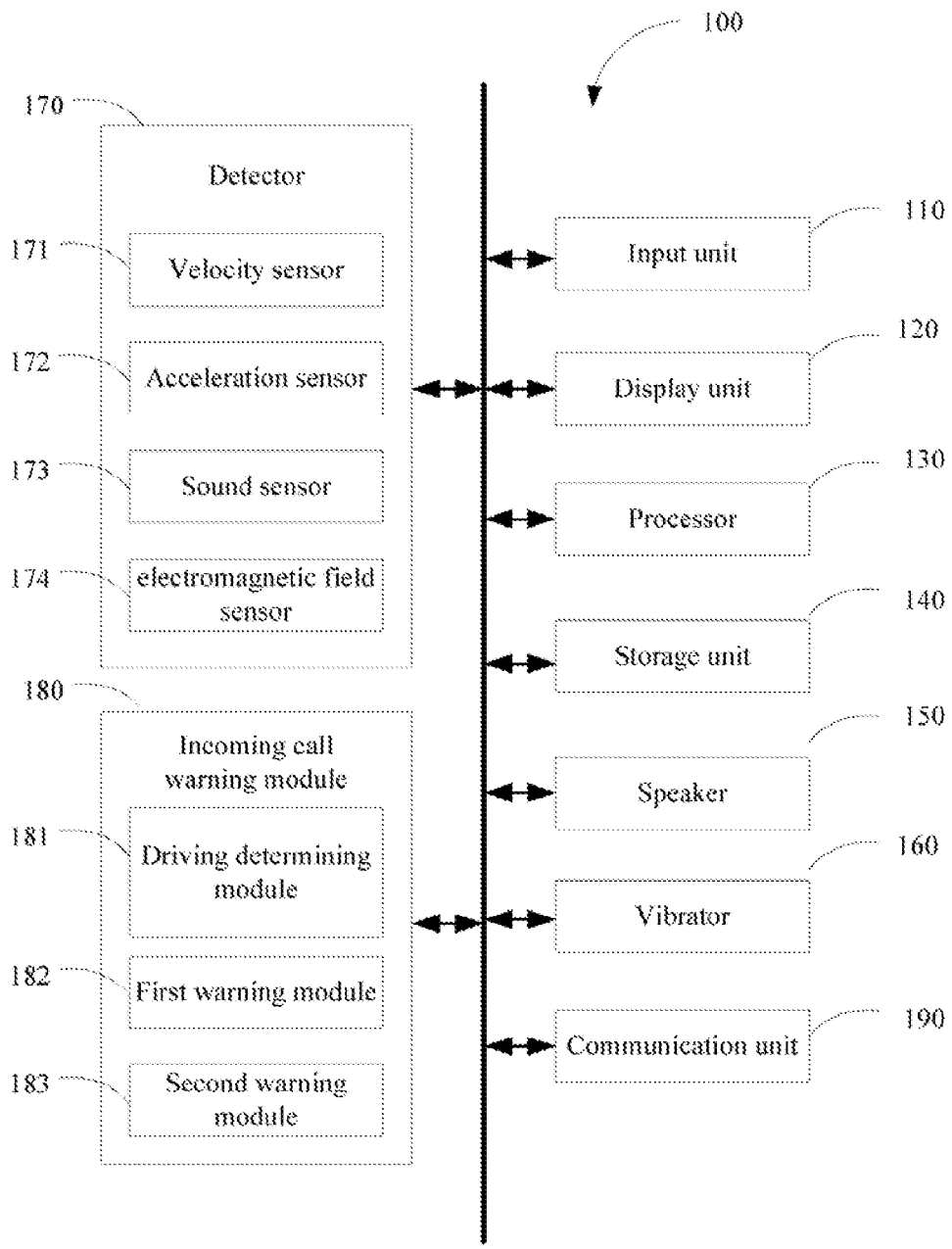
FIG. 1 is a schematic block diagram illustrating one embodiment of functional modules of an incoming call warning device.

Referring to FIG. 1, a schematic block diagram illustrating one embodiment of functional modules of an incoming call warning device 100 according to the present disclosure is shown. The incoming call warning device 100 includes an input unit 110, a display unit 120, a processor 130, a storage unit 140, a speaker 150, a vibrator 160, a detector 170, an incoming call warning module 180, and a communication unit 190. In this embodiment, the incoming call warning device 100 may be a mobile phone or mobile communication terminal which employs services provided by a telecommunication company. In one embodiment, the communication unit 190 may be selected from a group consisting of a global system for a mobile communication (GSM) unit, a code division multiple access (CDMA) unit, or a wide band CDMA (WCDMA) unit.

The input unit 110 is configured to input instructions, message, or information from a user.

The display unit 120 is configured to display images, messages or control interface.

The storage unit 140 is configured to store a warning message, a warning sound and a warning vibration, and/or other related parameters and data. In this embodiment, the storage unit 140 is further configured to store a plurality of reference parameters. The reference parameters include at least a reference velocity, a reference acceleration, reference sounds, and a reference electromagnetic field density. In one embodiment, the reference sounds include at least a car reference noise, a bus reference noise, a train reference noise, and a subway reference noise. In one embodiment, the storage unit 140 can be selected from a group consisting of compact discs (CDs), digital video discs (DVDs), BLU-RAY discs, Flash memory, and hard disk drives.

The detector 170 is configured to detect a plurality of parameters of the incoming call warning device 100. In the embodiment, the detected parameters include at least a detected velocity, a detected acceleration, a detected sound level, and a detected electromagnetic field density. In one embodiment, the detector 170 includes a velocity sensor 171, an acceleration sensor 172, a sound sensor 173 and an electromagnetic field sensor 174, respectively configured to detect a current velocity of the incoming call warning device 100, a current acceleration of the incoming call warning device 100, a current sound level of the incoming call warning device 100, and a current electromagnetic field density of the incoming call warning device 100.

The incoming call warning module 180 may include a plurality of programs in the form of one or more computerized instructions stored in the storage unit 140 and executed by the processor 130 to perform operations of the incoming call warning device 100. In one embodiment, the incoming call warning module 180 is executed by the processor 130 for determining whether a user of the incoming call warning device 100 is driving according to a comparison result of the reference parameters and the detected parameters. Further warning the user of the incoming call warning device 100 that a driver should not communicate or answer an incoming call while driving. In this embodiment, the incoming call warning module 180 includes a driving determining module 181, a first warning module 182, and a second warning module 183.

The driving determining module 181 is configured to receive the plurality of detected parameters from the detector 170 and the plurality of reference parameters from the storage unit 140, and correspondingly compares the detected parameters with the reference parameters to determine whether a user of the incoming call warning device 100 is driving.

When the user of the incoming call warning device 100 is driving, the first warning module 182 takes the warning sound and the warning vibration from the storage unit 140. And then controls the speaker 150 to play the warning sound or the vibrator 160 to perform the warning vibration to warn the user of the incoming call warning device 100 that the user should not communicate or answer an incoming call while driving.

Simultaneously, the incoming call warning module 180 takes the warning message from the storage unit 140 and controls the communication unit 190 to automatically send the warning message to a third-party communication terminal of a person who is making the call or communicates with the user of the incoming call warning device 100. The warning message can remind the person that the user of the incoming call warning device 100 is busy and will return the call. In alternative embodiments, one of the first warning module 182 and the second warning module 183 may be omitted.

Figure 2:
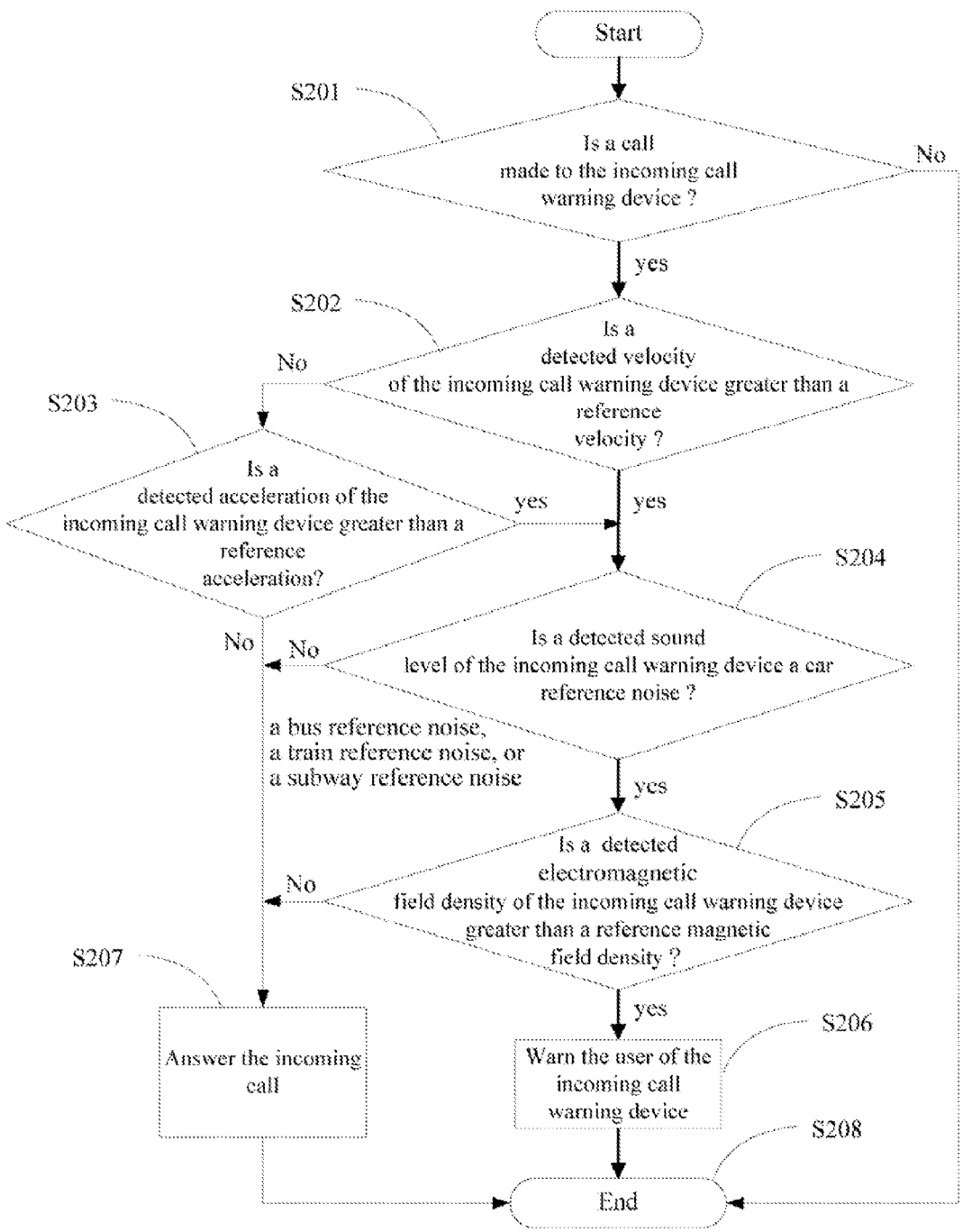
FIG. 2 is a flowchart of one embodiment showing an incoming call warning method using the incoming call warning device of FIG. 1.

FIG. 2 is a flowchart of one embodiment showing an incoming call warning method. The method is carried out using the incoming call warning device 100 to warn the user of the incoming call warning device 100 that a driver should not communicate or answer an incoming call while driving. Depending on the embodiment, additional steps may be added, others removed, and the ordering of the steps may be changed.

In step S201, the communication unit 190 detects whether a call is made to the incoming call warning device 100. The communication unit 190 also detects whether the user of the incoming call warning device 100 is communicating with other person. Whether a call is made to the incoming call warning device 100 or the user of incoming call warning device 100 is communicating with other person, step S202 is performed, otherwise, the process ends.

In step S202, the driving determining module 181 determines whether the detected velocity of the incoming call warning device 100 is greater than the reference velocity. In detail, the velocity sensor 171 detects a current velocity of the incoming call warning device 100 and sends the detected velocity of the incoming call warning device 100 to the driving determining module 181. The driving determining module 181 takes the reference velocity from the storage unit 140, and then compares the detected velocity with the reference velocity. When the detected velocity of the incoming call warning device 100 is greater than the reference velocity, step S204 is performed, otherwise, step S203 is performed. In one embodiment, the velocity sensor 171 may be a global positioning system (GPS) and the reference velocity may be selected from 5 kilometers/hour to 7 kilometers/hour.

In step S203, the driving determining module 181 determines whether the detected acceleration of the incoming call warning device 100 is greater than the reference acceleration. In detail, the acceleration sensor 172 detects a current acceleration of the incoming call warning device 100 and sends the detected acceleration of the incoming call warning device 100 to the driving determining module 181. The driving determining module 181 takes the reference acceleration from the storage unit 140, and then compares the detected acceleration with the reference acceleration. When the detected acceleration of the incoming call warning device 100 is greater than the reference acceleration, step S204 is performed, otherwise, step S207 is performed. In one embodiment, the reference acceleration is 4.17 meters/second$^2$ In alternative embodiment, step S203 may be omitted. Under this condition, when the detected velocity of the incoming call warning device 100 is greater than the reference velocity, step S202 goes to step S204, otherwise, step S202 goes to step S207.

In step S204, the driving determining module 181 determines which reference sound the detected sound level is or similar to. In detail, the sound sensor 173 samples noise of an environment in which the incoming call warning device 100 is placed and generates a detected sound level. The driving determining module 181 then takes the reference sounds from the storage unit 140, and correspondingly compares detected sound level with each one of the reference sounds to determine which reference sound the detected sound belongs to. When the detected sound level is a car reference noise, step S205 is performed. When the detected sound level is one of the reference noises, the bus reference noise, the train reference noise, or the subway reference noise, step S207 is performed. In one embodiment, the sound sensor 173 may be a noise reduction microphone.

In step S205, the driving determining module 181 determines whether the detected electromagnetic field density of the incoming call warning device 100 is greater than the reference electromagnetic field density. In detail, the electromagnetic field sensor 174 detects a current electromagnetic field density of an environment in which the incoming call warning device 100 is placed and sends the detected electromagnetic field density of the incoming call warning device 100 to the driving determining module 181. The driving determining module 181 takes the reference electromagnetic field density from the storage unit 140, and then the driving determining module 181 compares the detected electromagnetic field density with the reference electromagnetic field density. When the detected electromagnetic field density of the incoming call warning device 100 is greater than the reference electromagnetic field density, step S206 is performed, otherwise, step S207 is performed. In one embodiment, the reference electromagnetic field density may be set to a value, which is greater than zero and less than an electromagnetic field density sampled close to the drivers seat in a car of the user. In alternative embodiment, the electromagnetic field density at different seat may be used to distinguish the passenger and the driver.

In step S206, the first warning module 182 warns the user of the incoming call warning device 100 that a driver should not communicate or answer an incoming call while driving. In detail, the driving determining module 181 determines that the user of the incoming call warning device 100 is driving. The first warning module 182 takes the warning sound and/or the warning vibration from the storage unit 140. And then controls the speaker 150 to play the warning sound and/or control the vibrator 160 to vibrate to warn the user of the incoming call warning device 100 that a driver should not communicate or answer an incoming call while driving.

In other embodiments, the incoming call warning module 183 may take the warning message from the storage unit 140 and control the communication unit 190 to automatically send the warning message to a third-party communication terminal of a person who is making a call to or communicate with the user of the incoming call warning device 100. The warning message can remind the person that the user of the incoming call warning device 100 is busy and will return the call shortly. In alternative embodiments, one of the first warning module 182 and the second warning module 183 may be omitted.

In step S207, the user of the incoming call warning device 100 may communicate with or answer the incoming call from other person without being warned.

In step S208, the process ends.

Even though numerous characteristics and advantages of certain inventive embodiments have been set out in the foregoing description, together with details of the structures and functions of the embodiments, the disclosure is illustrative only; and changes may be made in detail, especially in the matter of arrangement of parts within the principles of present invention to the full extent indicated by the broad general meaning of the terms in which the appended claims are expressed.

What is claimed is:

1. An incoming call warning device, comprising:
   a storage unit configured for storing a plurality of reference parameters comprising a reference electromagnetic field density;
   a communication unit configured for determining whether a call is made to the incoming call warning device;
   a detector configured for detecting a plurality of parameters related to the incoming call warning device when a call is made to the incoming call warning device, and
   an incoming call warning module configured for comparing the reference parameters comprising the reference electromagnetic field density with the detected parameters to determine whether a user of the incoming call warning device is driving, and warning the user not to answer the incoming call while driving.

2. The incoming call warning device of claim 1, wherein the storage unit is further configured for storing a warning sound, and the incoming call warning module takes the warning sound from the storage unit, and controls a speaker to play the warning sound when the user of the incoming call warning device is driving.

3. The incoming call warning device of claim 1, wherein the storage unit is further configured for storing a warning vibration, and the incoming call warning module takes the warning vibration from the storage unit, and controls a vibrator to perform the warning vibration when the user of the incoming call warning device is driving.

4. The incoming call warning device of claim 1, wherein the storage unit is further configured for storing a warning message, and the incoming call warning module takes the warning message from the storage unit and controls the communication unit to automatically send the warning message to a third-party communication terminal of a person who is making a call to the user of the incoming call warning device.

5. The incoming call warning device of claim 1, wherein the reference parameters further comprise a reference velocity, a reference acceleration, and reference sounds, and the detected parameters comprise a detected velocity, a detected acceleration, a detected sound level, and a detected electromagnetic field density.

6. The incoming call warning device of claim 5, wherein the detector comprises a velocity sensor, an acceleration sensor, a sound sensor, and an electromagnetic sensor, respectively configured to detect a current velocity of the incoming call warning device, a current acceleration of the incoming call warning device, a current sound level of the incoming call warning device, and a current electromagnetic field density of the incoming call warning device.

7. The incoming call warning device of claim 5, wherein the reference velocity is 5-7 kilometers/hour, and the reference acceleration is 4.17 meters/second$^2$.

8. The incoming call warning device of claim 5, wherein the reference electromagnetic field density is set to a value which is greater than zero and less than an environment electromagnetic field density sampled close to a seat in a car of the user.

9. The incoming call warning device of claim 5, wherein the reference sounds comprise a car reference noise, a bus reference noise, a train reference noise, and a subway reference noise.

10. The incoming call warning device of claim 1, wherein the communication unit is selected from a group consisting of a global system for a mobile communication (GSM) unit, a code division multiple access (CDMA) unit, and a wide band CDMA (WCDMA) unit.

11. An incoming call warning method, comprising:
storing a plurality of reference parameters comprising a reference electromagnetic field density by a storage unit;
determining whether a call is made to an incoming call warning device by a communication unit;
detecting a plurality of parameters when a call is made to the incoming call warning device by a detector; and
determining whether a user of the incoming call warning device is driving by comparing the reference parameters comprising a reference electromagnetic field density with the detected parameters, and warning the user of the incoming call warning device that a driver should not communicate or answer an incoming call while driving.

12. The method of claim 11, further comprising: storing a warning sound, taking the warning sound from the storage unit, and controlling a speaker to play the warning sound when the user of the incoming call warning device is driving.

13. The method of claim 11, further comprising: storing a warning vibration, taking the warning vibration from the storage unit, and controlling a vibrator to perform the warning vibration when the user of the incoming call warning device is driving.

14. The method of claim 11, further comprising: storing a warning message, taking the warning message from the storage unit, and controlling the communication unit to send the warning message to a third-party communication terminal of a person who is making a call to the user of the incoming call warning device.

15. The method of claim 11, wherein the reference parameters further comprise a reference velocity, a reference acceleration, and reference sounds, and the detected parameters comprise a detected velocity, a detected acceleration, a detected sound level, and a detected electromagnetic field density, the detector comprises a velocity sensor, an acceleration sensor, a sound sensor, and an electromagnetic sensor, respectively configured to detect a current velocity, a current acceleration, a current sound level, and a current electromagnetic field density.

16. The method of claim 15, wherein the reference velocity is 5-7 kilometers/hour, and the reference acceleration is 4.17 meters/second.

17. The method of claim 15, wherein the reference electromagnetic field density is greater than zero and less than a detected electromagnetic field density sampled close to a driving seat in a car of the user.

18. The method of claim 15, wherein the reference sounds comprise a car reference noise, a bus reference noise, a train reference noise, and a subway reference noise.

19. The method of claim 18, wherein the determining whether a user of the incoming call warning device is driving a car comprises determining whether the detected velocity of the incoming call warning device is greater than the reference velocity, determining whether the detected sound level is a car reference noise when the detected velocity of the incoming call warning device is greater than the reference velocity, and determining whether the detected electromagnetic field density of the incoming call warning device is greater than the reference electromagnetic field density when the detected sound level is a car reference noise.

20. The method of claim 19, wherein the determining whether a user of the incoming call warning device is driving a car further comprises determining whether the detected acceleration of the incoming call warning device is greater than the reference acceleration when the detected velocity of the incoming call warning device is greater than the reference velocity, and determining whether the detected sound level is a car reference noise when the detected acceleration of the incoming call warning device is greater than the reference acceleration.

* * * * *